United States Patent

[11] 3,573,595

[72] Inventor Filippo B. Galluppi
Mt. Vernon, N.Y.

[21] Appl. No. 828,567
[22] Filed May 28, 1969
[45] Patented Apr. 6, 1971
[73] Assignee Venus Scientific Inc.
Farmingdale, N.Y.

[54] CONSTANT CURRENT FEEDBACK REGULATOR WITH ADJUSTABLE IMPEDANCE FOR MAINTAINING CONSTANT CURRENT
7 Claims, 3 Drawing Figs.

[52] U.S. Cl. .......... 321/2, 321/18, 323/1, 331/113
[51] Int. Cl. .......... H02p 13/22, H02m 3/22, H03k 3/281
[50] Field of Search .......... 321/2, 15, 18; 323/1, 4, 8; 331/109, 113.1

[56] References Cited

UNITED STATES PATENTS

| | | | |
|---|---|---|---|
| 3,192,464 | 6/1965 | Johnson et al. .......... | 321/2 |
| 3,327,199 | 6/1967 | Gardner et al. .......... | 321/2 |
| 3,417,319 | 12/1968 | Shaughnessy .......... | 323/4 |

*Primary Examiner*—William H. Beha, Jr.
*Attorney*—Ostrolenk, Faber, Gerb & Soffen

ABSTRACT: A high-voltage power supply has a controlled output oscillator operated from a low-voltage DC source. The output voltage of the oscillator is increased by a voltage multiplier. A series circuit comprising a high ohmic resistor, a transistor device and an adjustable low ohmic resistor is connected in parallel with the oscillator output, and the transistor impedance is varied to maintain a constant current in the parallel path. The voltage developed at the transistor for maintaining a constant current is then used to control the oscillator in order to maintain constant output voltage.

INVENTOR.
FILIPPO B. GALLUPPI

BY

OSTROLENK, FABER, GERB & SOFFEN

ATTORNEYS

Patented April 6, 1971 3,573,595

2 Sheets-Sheet 2

CONSTANT CURRENT FEEDBACK REGULATOR WITH ADJUSTABLE IMPEDANCE FOR MAINTAINING CONSTANT CURRENT

This invention relates to power supplies, and more particularly relates to a novel feedback regulator for a high-voltage power supply.

Voltage feedback arrangements are well known for the regulation of a power supply. In such circuits, the output voltage is sampled by a factor which will allow the feedback voltage to be low enough in magnitude so that its DC level is directly related to the input of the regulation amplifier. This scheme has several drawbacks where the output voltage of the power supply is extremely high, say of the order of 5,000 volts and greater. For example, a power supply having a low-voltage output of 50 volts would attenuate a sampled signal by a factor of 10 if the DC level feeding the reference amplifier is 5 volts. If the voltage output were 500 volts, the attenuation would have to be 100; for a 5,000 volt power supply the attenuation would be 1,000 etc. Thus, in order to retain a high degree of regulation in the feedback loop, the amplifier gain must increase proportionately with the increase in attenuation in the voltage divider. Therefore, amplifier gain will be proportional to output voltage At these higher voltages, the feedback amplifier will have a gain stability problem in regard to both amplifier drift and a tendency to oscillate.

Other high-voltage power supplies have been constructed using series-connected Zener diodes. In a high-voltage power supply, however, the large number of Zener diodes which must be connected in series makes the device expensive and unreliable. Moreover, the fixed value of the string of Zener diodes makes it extremely difficult to obtain voltage adjustment of the output, and the high temperature coefficient of Zeners is not easily compensated in a large series string.

The principle of the present invention is to provide a novel regulated power supply in which a constant current is caused to flow in a high-resistance path in parallel with the power supply output. By forcing a constant current to flow through a high-voltage resistor, there is produced a voltage drop such that the output voltage level is reduced without appreciable attenuation of the error signal. For example, with a power supply having an output voltage of 10,000 volts, a constant current of 100 microamperes in a 100 megohm resistor results in an output point having a very small DC level. If the constant current source has a 20 megohm internal impedance, then error signals can be attained with an attenuation of only a factor of 6.

In accordance with a preferred embodiment of the invention, constant current is obtained by means of a suitable transistor, the impedance of which is varied in order to maintain a constant current in the high-voltage resistor. The voltage drop on the transistor is then used to generate an error signal which is connected back to the oscillator in order to maintain a constant output voltage. When using this approach, a change, for example, of 6 volts at a 20 kv. point will appear as a change of approximately 1 volt at the error signal input. Moreover, this is obtained with an amplifier gain no greater than unity. It is also possible to vary output voltage easily by merely adjusting the constant current source. For example, reducing the 100 microamperes in the constant current circuit to 10 microamperes would force the output voltage to drop from 20kv. to 2 kv. The circuit of the present invention has the further advantage of requiring relatively few components having small temperature coefficients. Thus, the circuit is reliable and is stable under temperature variations.

Accordingly, a primary object of this invention is to provide a novel power supply which is extremely stable.

Another object of this invention is to provide a highly accurately regulated power supply which uses relatively few components.

A further object of this invention is to provide a novel constant current feedback arrangement for power supplies which uses amplifiers having relatively small gain.

These and other objects of this invention will become apparent from the following description when taken in connection with the drawings, in which.

Figure 1:
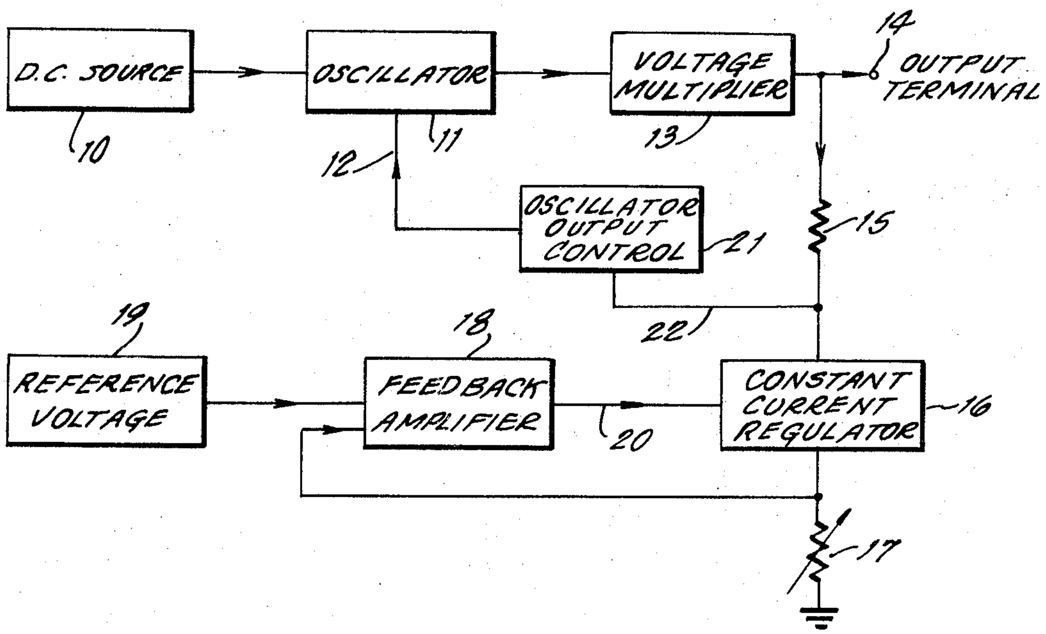
FIG. 1 shows the power supply circuit of the invention in block diagram form.

Referring to FIG. 1 the power supply is operated from a suitable voltage source such as DC source 10 which could be a battery or the like having an output voltage which, typically, could be 14 volts. Source 10 is connected to oscillator 11 which converts the voltage of source 10 to an AC voltage. Moreover, oscillator 11 is suitably controlled to deliver a variable output voltage, depending on the voltage connected to its control input lead 12. The output of oscillator 11 is then suitably increased as by voltage multiplier 13 which may be of any desired type which delivers an output voltage to output terminal 14 which could be, for example, 6,000 volts with respect to ground.

The voltage at terminal 14 is connected in series with a high voltage resistor 15, a constant current regulator 16, and an adjustable resistor 17 (which could be a potentiometer). The maximum resistance of adjustable resistor 17 is only a small fraction of the resistance of high-voltage resistor 15. By way of example, resistor 15 may have a value of 200 megohms, while adjustable resistor 17 may have a full resistance of about 225 kΩ.

In accordance with the invention, the current through resistors 15 and 17 is maintained constant by regulator 16, regardless of changes in the output voltage at terminal 14. In this manner, an error signal is generated to adjust oscillator 11, thereby to maintain constant the voltage at terminal 14. Thus, a feedback amplifier 18 is arranged to control constant current regulator 16 in response to the output voltage appearing at the upper terminal of resistor 17. This output voltage is compared to a reference voltage obtained from reference voltage source 19 so that, if the current through resistors 15 and 17 changes due to a changing voltage at terminal 14, the bias or control signal level applied to constant current regulator 16 from lead 20, is changed to bring the resistor current back to its nominal value. The potential to ground of regulator 16 and resistor 17, therefore, varies with the fluctuation of voltage of terminal 14 when current regulator 16 maintains a constant current. This varying potential is then used to control the oscillator output control circuit 21 by means of lead 22 connected above regulator 16. Control circuit 21 then adjusts the output of oscillator 11 to return the voltage of terminal 14 to a nominal value.

Figure 2:
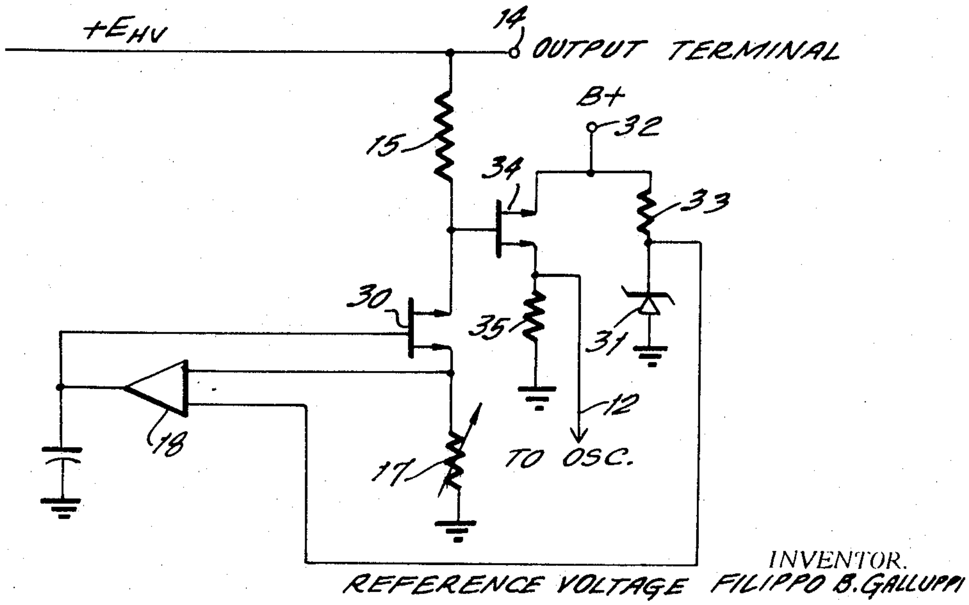
FIG. 2 is a circuit diagram of the portion of the circuit of FIG. 1 which forms the output regulation control.

FIG. 2 shows some of the critical circuitry which could be used in the block diagram of FIG. 1. Components of FIG. 2 which are the same as those of FIG. 1 are given the same identifying numeral. Thus output terminal 14 which carries the output voltage $+E_{HV}$ is connected in series with resistors 15 and 17. A field effect transistor (F.E.T.) 30 acts as the regulator 16 of FIG. 1 and has its source and drain electrodes in series with resistors 15 and 17. The output of amplifier 18 is connected to the gate electrode of F.E.T. 30. Amplifier 18 is a differential amplifier and receives one input from the top of resistor 17, and a reference voltage input fixed by Zener diode 31. A positive biasing voltage source (B+) connected to terminal 32 is connected in series with resistor 33 and Zener diode 31 and is further connected in series with the source and drain electrodes of F.E.T. 34 and resistor 35. The F.E.T. 34 serves the purpose of oscillator control circuit 21 of FIG. 1, and the gate electrode of F.E.T. 34 is connected to the source electrode of F.E.T. 30. Output lead 12 from the drain electrode F.E.T. 34 controls the DC output to terminal 14, and returns this output to its nominal value.

Figure 3:
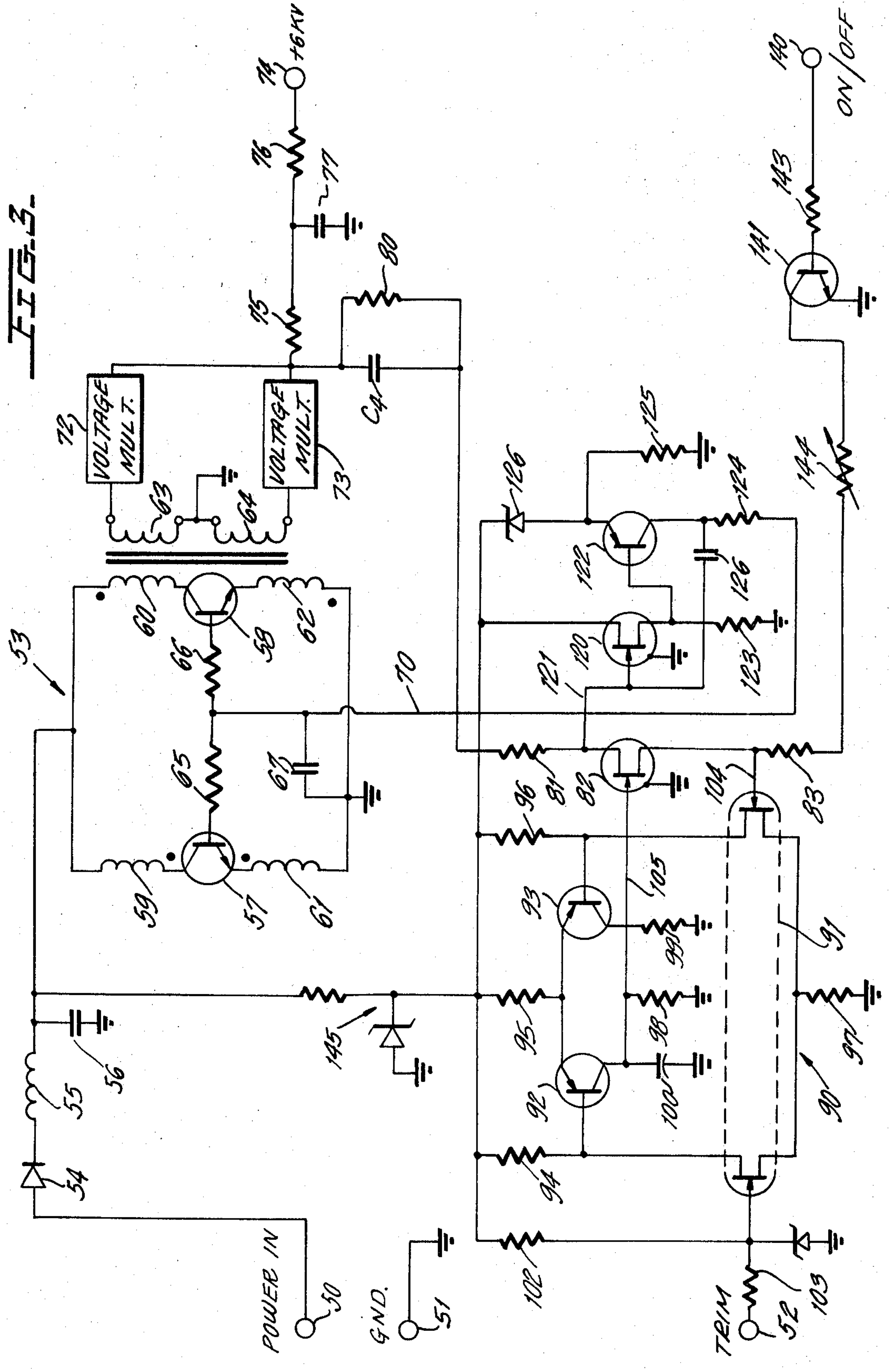
FIG. 3 is a detailed circuit diagram of a power supply which incorporates the present invention.

FIG. 3 shows a complete circuit of a power supply incorporating the present invention in which a constant output voltage of 6,000 volts is obtained from a 14 volt DC source connected to input terminal 50. The apparatus is also provided with a ground terminal 51, an on-off terminal 140 and an output terminal 74.

The positive voltage at terminal 50 is connected to oscillator 53 through diode 54, and the RF filter consisting of choke 55 and capacitor 56. Oscillator 53 consists of a base drive transistor oscillator which is well known and contains transistors 57 and 58, and a transformer having windings 59 to 62, having winding directions, as shown by the conventional dots, and output windings 63 and 64. All of windings 59 to 64 are wound on a common core. The bases of transistors 57 and 58 are connected to one another by resistors 65 and 66. A novel capacitor 67 is then connected from the junction of resistors 65 and 66 to ground. Capacitor 67 reduces the amount of DC idling current drawn by the oscillator whether it is at full load or no-load. Capacitor 67 has been found to increase the efficiency of the oscillator at full load. It is believed that this is because the capacitor reduces the magnetizing current required by the oscillator transformer.

The output of oscillator 53 is then controlled in the usual manner by applying a bias to control lead 70, thereby to linearly control the output voltage of the oscillator. As will be seen, the signal on lead 70 is obtained from the novel feedback circuit of the invention.

The output of oscillator windings 63 and 64 is connected to a suitable voltage multiplier, such as voltage multipliers 72 and 73, and which bring the output voltage to its desired level, for example, 6 kv. at output terminal 74. Current-limiting resistors 75 and 76 and filter capacitor 77 are arranged in the output circuit.

In accordance with the invention, a constant current feedback circuit is formed which includes a high-voltage, high-ohmic resistor 80 (200 megohms), resistor 81, field effect transistor 82, (hereinafter an F.E.T.) resistor 83, and adjustable resistor 144. Note the correspondence of F.E.T. 82, resistor 80 and resistor 144 of FIG. 3 to F.E.T. 30, resistor 15 and adjustable resistor 17, respectively, of FIG. 2.

An amplifier 90 is then provided in FIG. 3, corresponding to amplifier 18 of FIG. 2 and has a dual F.E.T. 91 and transistors 92 and 93. Amplifier 90 is connected to power terminal 50 through a Zener diode regulator 145 and ground which supply suitable bias voltages over resistors 94 to 99 and capacitor 100. A reference voltage source is formed by Zener diode 101 (type IN 823) which is connected to resistor 102, and corresponds to Zener 31 of FIG. 2. Zener 101 and resistor 103 define the reference voltage applied to the first gate of F.E.T. 91. Lead 104 from the top of resistor 83 applies an input signal to the second gate of F.E.T. 91 which depends on the voltage drop of resistors 83 and 144.

Amplifier 90 operates to compare the signal at lead 104 to the reference. A change in the signal at lead 104 (due to a change in output voltage at output terminal 74) will change the output of amplifier 90 at its output lead 105 which is connected to the gate of F.E.T. 82. This will then change the impedance of the source-drain circuit of F.E.T. 82 in a direction to bring the current through high-voltage resistor 80 to it s predetermined fixed value.

The source electrode of transistor 82 is connected to gate electrode of F.E.T. 120 (which corresponds to F.E.T. 34 in FIG. 2) by lead 121. F.E.T. 120 and transistor 122 are connected to one another, and are provided with suitable bias voltages by resistors 123, 124, 125, Zener diode 126 (type IN 4728A) and capacitor 126. The output of this circuit is the lead 70, leading to oscillator 53. It will be readily understood that the signal on lead 121 will vary with the potential on the source electrode of F.E.T. 82, as F.E.T. 82 varies its impedance to maintain a constant current. Thus the signal on the gate of F.E.T. 120 varies with the output of F.E.T. 120 being amplified by transistor 122 and is applied to lead 70. This in turn controls oscillator 53 such that the oscillator output is varied to bring the voltage of output terminal 74 back to its nominal value.

A terminal 140 is also provided in FIG. 3 for turning the device on and off in response to a signal connected to terminal 140. Thus, transistor 141 is connected so as to increase the impedance to a value so great as to turn off the current in F.E.T. 82. If a signal is connected to terminal 140, transistor 141 conducts and resistor 144 is essentially connected to ground so that current may flow in resistor 83, 144 and F.E.T. 82. However, when the signal is removed from terminal 140, F.E.T. 82 is almost cut off which, in turn, causes F.E.T. 120 to conduct and in turn, cuts off transistor 122, thereby cutting off oscillator 53.

The following component sizes can be used in the circuit of FIG. 3:

Capacitors

| | | |
|---|---|---|
| 56 | 33 microfarad | 75 volts. |
| 67 | .047 microfarad | |
| 77 | .022 | 10 kv. |
| 100 | 4.7 microfarad | 10 volts. |
| 126 | 2,200 picofarad | |

| | | |
|---|---|---|
| Transistors: | | |
| 57 | | 2N3773 |
| 58 | | 2N3773 |
| 82 | | 2N4220 |
| 91 | | 5U2080 |
| 92 | | 2N4248 |
| 93 | | 2N4248 |
| 120 | | 2N4220 |
| 122 | | 2N2907 |
| 141 | | 2N718A |
| Resistors: | | |
| 65 | ohms | 100 |
| 66 | do | 100 |
| 75 | | 10K |
| 76 | | 10K |
| 80 | megohms (10 kv.) | 200 |
| 81 | | 200K |
| 83 | | 75K(1%) |
| 94 | | 4.7K |
| 95 | | 10K |
| 96 | | 4.7K |
| 97 | | 4.7K |
| 98 | | 47K |
| 99 | | 22K |
| 102 | | 1K |
| 123 | | 22K |
| 124 | | 1K |
| 125 | | 4.7K |
| 143 | | 1K |
| 144 | | 100K |

Although there has been described a preferred embodiment of this novel invention, many variations and modifications will now be apparent to those skilled in the art. Therefore, this invention is limited, not by the specific disclosure herein, but only by the appending claims.

I claim:

1. A high voltage power supply comprising, in combination:

a. an input voltage source;

b. an oscillator circuit connected to said input voltage source and having an output voltage control means;

c. voltage increasing circuit means connected to the output of said oscillator and having an output voltage;

d. a constant current circuit means connected in parallel with the output voltage of said voltage increasing circuit means; said constant current circuit means comprising a relatively high ohmic resistor, a variable impedance means having a control electrode for varying the impedance thereof, and a relatively low ohmic resistor;

e. a feedback circuit including an amplifier means having an input circuit and an output circuit; said input circuit connected across said relatively low ohmic resistor; said output circuit connected to said control electrode of said variable impedance means; said amplifier means varying the impedance of said adjustable impedance means to maintain a constant current in said parallel circuit; and f. control circuit means having an input and an output circuit; said input circuit of said control circuit means connected across said variable impedance means; said output circuit of said control circuit means connected to said output control circuit means of said oscillator circuit thereby to vary the output voltage of said power supply to maintain a constant current in said parallel circuit.

2. The power supply of claim 1 wherein said relatively low ohmic resistor is adjustable.

3. The power supply of claim 1 wherein said relatively high ohmic resistor has a resistance which is of the order of 1,000 times as large as said relatively low ohmic resistor and wherein the current in said parallel circuit is of the order of several hundred microamperes or less.

4. The power supply of claim 1 wherein said variable impedance means said control circuit means are transistors.

5. The power supply of claim 1 wherein said amplifier means includes a reference voltage input circuit connected to a fixed voltage source for comparison to the voltage of said input circuit.

6. In a high-voltage power supply comprising an input DC voltage conversion means having a voltage varying control circuit connected to said input DC voltage for converting said DC voltage to an AC voltage of a magnitude dependent upon the voltage applied to said control circuit, and an output voltage control circuit for applying a voltage to said control circuit to maintain a constant output voltage; said output voltage control circuit comprising an output voltage measuring circuit in parallel with said output voltage of said power supply, a variable impedance means in said voltage measuring circuit for maintaining a constant current therethrough regardless of variations in said output voltage of said power supply and circuit means connecting a voltage related to the voltage drop across said variable impedance means to said voltage varying control circuit; and said variable impedance including the series connection of a transistor and an adjustable resistor.

7. The device of claim 6 wherein said constant current circuit includes a series resistor having a resistance substantially greater than the impedance of said variable impedance.